Figure 1:
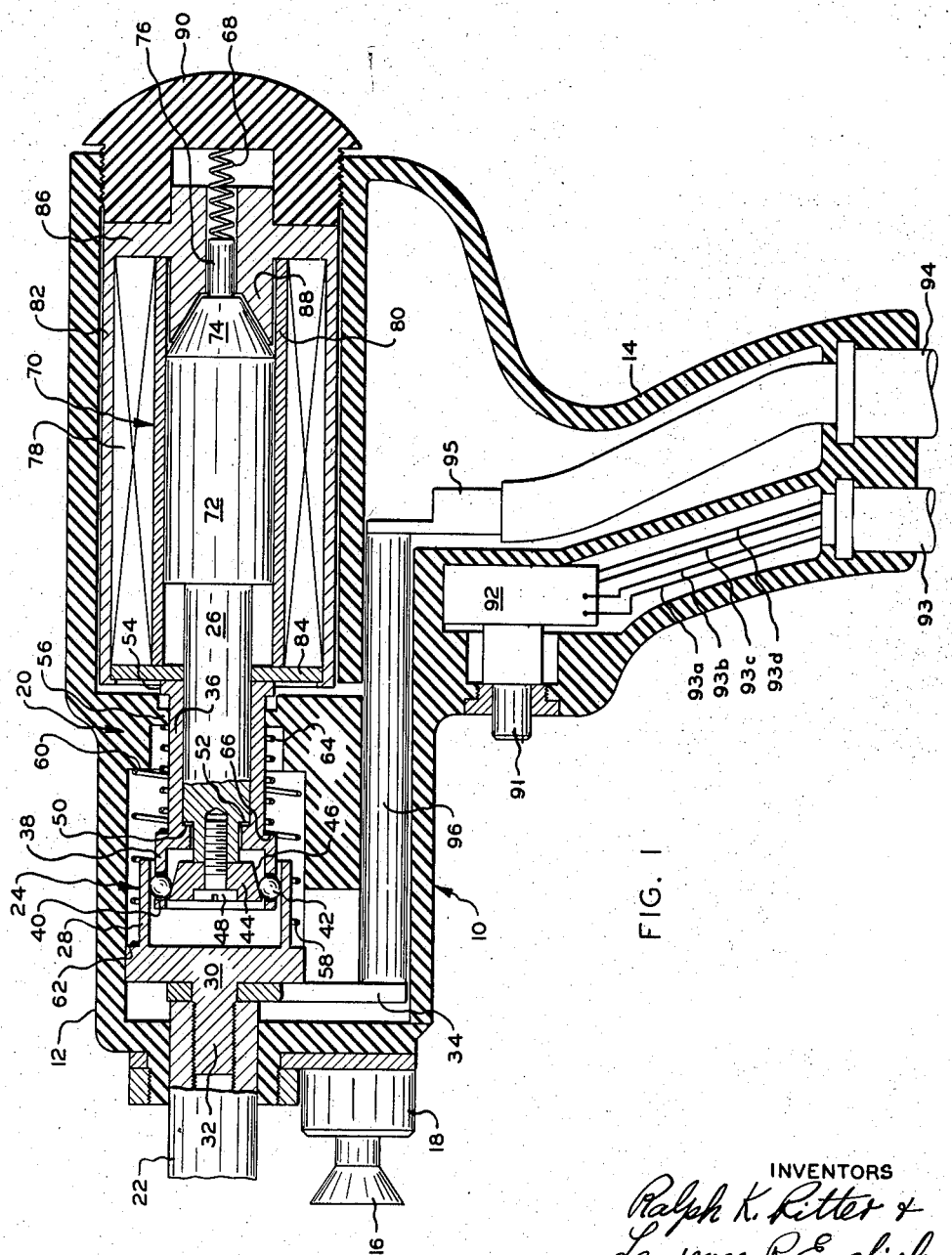

INVENTORS
Ralph K. Ritter +
Lawrence P. English
BY Morse + Altman
ATTORNEYS

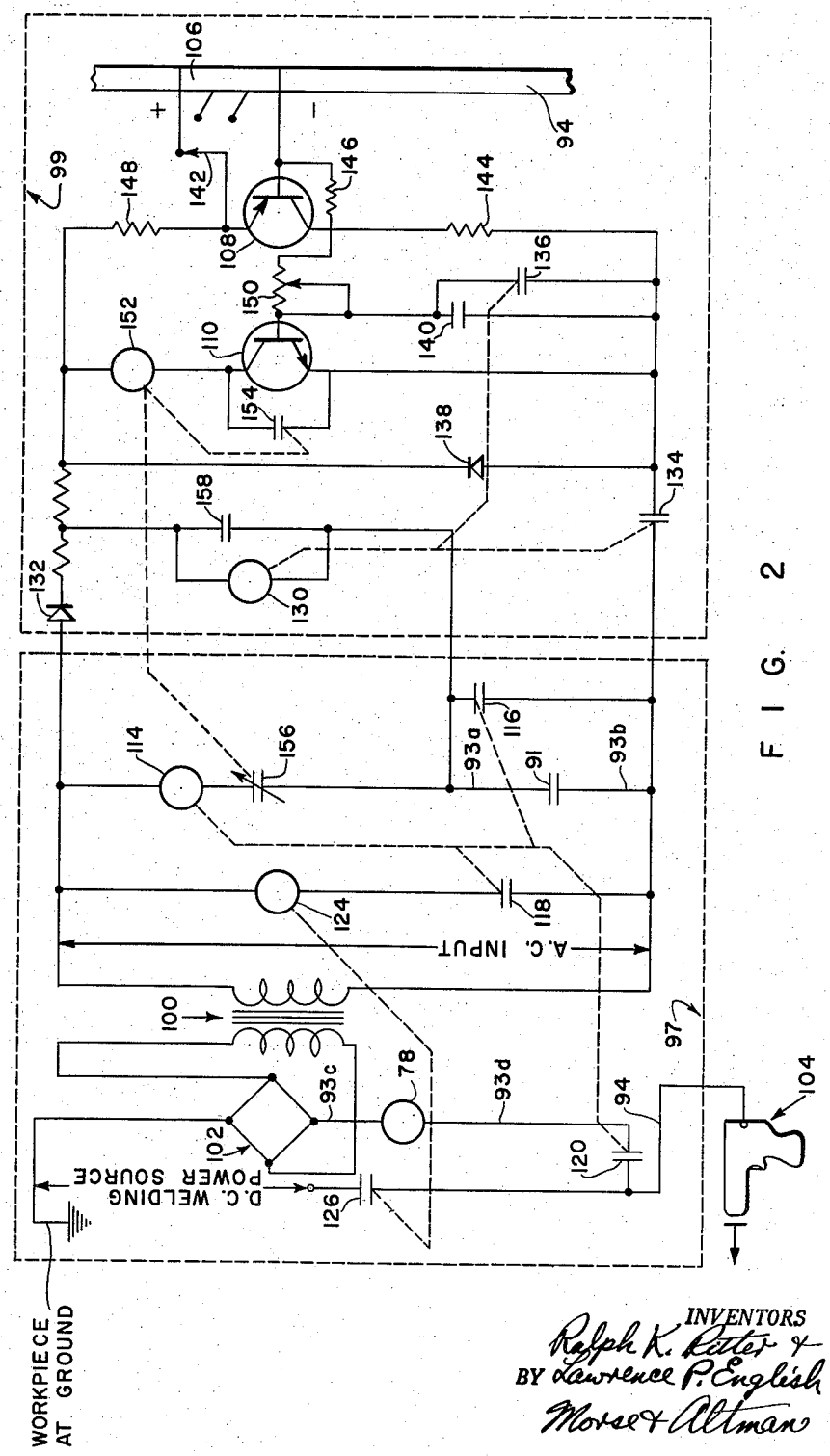

United States Patent Office 3,100,833
Patented Aug. 13, 1963

3,100,833
STUD WELDING DEVICES
Ralph K. Ritter, Moorestown, and Lawrence P. English, Haddon Heights, N.J., assignors to SKSM Products, Inc., Moorestown, N.J., a corporation of New Jersey
Filed Jan. 3, 1961, Ser. No. 80,084
6 Claims. (Cl. 219—98)

The present invention relates to electric arc welding and, more particularly, to stud welding devices in one example of which a stud initially is held in contact with a base while a current is passed across the junction therebetween, next is withdrawn from the base to strike a pilot arc, then is maintained at a distance from the base while a welding arc is produced by a current directed across the ionized path established by the pilot arc and finally is plunged against the base in order to unite molten contiguous portions of the stud and the base. In order to achieve reproducible results, it is necessary that the amount of heating at the contiguous portions of the stud and the base be precisely predetermined at the moment the contiguous portions are united. However, oftentimes the heat produced by the welding arc is variable because the power source for the welding arc is not stable. For example: direct current motor generator and rectifier outputs generally decrease with increased temperature; battery sources decrease in voltage with rapid discharge; and line power is erratic because of the simultaneous presence of other loads.

The primary object of the present invention is to prevent fluctuations in the heating effect of a welding arc by a novel monitor circuit that cooperates with the remainder of the control system. Essentially this monitor circuit includes: a sensor that measures current of the welding arc as a function of time in order to produce a signal representing successive increments of energy converted into heat; and an accumulator for summing these increments in order to produce a servo indication which cuts off the welding arc when a predetermined quantity of heat has been produced.

Another object of the present invention is to provide arc welding devices of the foregoing type in which: the sensor is a shunt resistor, through which a predetermined minor portion of the current of the welding arc is channeled in order to produce an instantaneous voltage representing instantaneous welding arc energy; and the accumulator is a resistor-capacitor transient network, that accumulates a predetermined charge within a predetermined control in response to the applied voltage. By virtue of this sensor-accumulator network, the welding arc is cut off at the moment when the quantity of welding current converted to heat has reached a predetermined magnitude.

A further object of the present invention is to provide a control circuit of the foregoing type in a stud welding apparatus wherein a solenoid lift and spring return arrangement controls the relative positions of the stud and the base. In such a device, the control circuit and the mechanical components of the stud welding apparatus cooperate in an unusually simple manner to produce unusually precise results.

Other objects of the present invention will in part be obvious and will in part appear hereinafter.

The invention accordingly comprises the apparatus possessing the construction, combination of elements and arrangement of parts which are exemplified in the following detailed disclosure, and the scope of which will be indicated in the appended claims.

For a fuller understanding of the nature and objects of the present invention, reference should be had to the following detailed description taken in connection with the accompanying drawings, wherein:

FIG. 1 is a view, partly in section and partly in elevation, of one form of welding gun adapted to constitute a component of the apparatus of the present invention, the section being taken along the main longitudinal axis of the gun; and FIG. 2 is a schematic diagram of one form of electrical circuit embodying the novel control system of the present invention.

The illustrated stud welding circuit serves to energize and control a stud welding gun of the semi-automatic pistol type. It will be apparent, however, that such a circuit may be used in conjunction with other forms of guns, for example, of the automatic and stationary types. In its preferred form, the illustrated stud welding gun comprises a solenoid-actuated lift component, which is connected to a source of alternating current through a rectifier, and a stud holder, which is separately connected to a source of welding current. In consequence, the welding current is unaffected by the solenoid load and generates an arc that is capable of being monitored by the control circuit to be described in detail below. Generally this welding gun is of the type described in Patent No. 2,796,513, issued on June 18, 1957 in the name of Frank K. Kelemen, for "Stud Welding Apparatus."

In the illustrated device, the heat produced by the welding arc at the continguous surfaces of the stud and the base depends upon the voltage, current and duration of the welding arc. More specifically, the relationship is believed to be:

$$J = EIt$$

where:

$J$ = heat energy in Joules
$E$ = arc voltage in volts
$I$ = arc current in amperes
$t$ = arc time in seconds In arc stud welding, the voltage is approximately constant, in the present embodiment varying between 25 and 35 volts. If we assume the voltage of the foregoing equation to be constant, say equal to 30 volts, then:

$$J = 30\, It$$

In this form, the equation indicates that J is directly proportional to I and t and that, if I and t vary equally and inversely, J remains constant. In accordance with the foregoing, the illustrated embodiment of the present invention comprises a sensor of the instantaneous energy of the welding arc for providing a signal, an amplifier for raising the level of the signal to a useful magnitude, a timer that operates when the integrated quantity of generated heat rises to a predetermined level and a switch for cutting off the welding arc in response to the timer. The sensor is in the form of a shunt in the welding circuit that converts a fraction of the welding current to a voltage drop. This voltage drop is amplified by a buffer amplifier to the level necessary for operation of the timer. The timer is a resistor-capacitor coupling, the voltage across which rises to two thirds the applied voltage within a time interval equal to RC seconds, where R is resistance in ohms and C is capacitance in farads. In other words, the higher the applied voltage, the shorter the firing time of the timer. Since the voltage rise with respect to time in an RC network is an exponential function, linearity is achieved by operating the sensor in the range of the RC transient curve at which it is approximately straight. When the timer voltage has risen to a predetermined level, a switch cuts off the welding arc, at which time a predetermined quantity of heat has been generated.

Referring now to the drawings, and specifically to FIG. 1, there is shown one form of gun structure especially suited for use with the control circuit of the present invention. As shown, this structure comprises a main housing 10, preferably formed of an electrically nonconducting material, such as plastic, for example, of the thermosetting phenolic type. Housing 10 comprises a generally cylindrical barrel 12, and, in its preferred form, a handgrip or handle 14, and is preferably formed of two or more sections so that it can be easily disassembled to permit ready access to the operating elements contained therein. Slidably mounted in barrel 12, preferably beneath the main longitudinal axis thereof and symmetrically arranged with respect to the plane of this axis, is leg member 16. This is mounted for ready adjustment to any desired length, and suitable means (not shown) manually operable from the exterior of the gun, as by means of a nut 18, is provided for fixing leg member 16 against inadvertent movement.

Barrel 12 is provided with a main longitudinal bore open at both ends and has an intermediate inwardly extending section 20 which separates the bore into essentially two chambers. Slidably mounted in the front open end of the barrel are a stud holder means 22, which may comprise a chuck adapter, a chuck and a spring and which operatively mounts the stud, and a suitable arc shield. The stud is fixed in stud holder 22 so as to be movable therewith. Movably mounted in the chamber between section 20 and the front end of gun barrel 12 is a novel connecting mechanism 24 which is adapted to connect together stud holder 22 and a suitable lifting member 26. As shown, mechanism 24 comprises a ball-engaging barrel 28 which is preferably integrally formed with and extends rearwardly from a screw member 30. The threaded shank 32 of screw member 30 is screwed into a threaded bore provided for it in stud holder 22. Members 30 and 22 are formed of conducting material, preferably a metal such as steel, and barrel 28 is suitably heat-treated so that its internal surface has excellent wear resistance. Clamped between the forward wall of the head of screw member 30 and the end of stud holder 22 is a welding current conductor 34 which is suitably connected to the source of welding current by means to be more fully described hereinafter.

Slidably mounted for movement substantially coaxially with stud holder 22 and lifting member 26 is a sleeve 36 biased in plunge direction and provided with a forward cylindrical portion 38 of enlarged diameter. Portion 38 is equipped with a plurality of recesses 40 and serves as a cage to operatively mount a plurality of balls 42 in the recesses. Two balls have been shown in FIG. 1 in order to illustrate that a plurality of such balls are carried by the cage 38 and that these balls are equally spaced around the periphery of the cage to provide a uniform distribution of the lifting forces exerted thereby when in operation. Three balls 120° apart constitute a preferred arrangement. Ball cage 38 has an outer diameter which is sufficiently smaller than the internal diameter of the ball-engaging surface of barrel 28, within which it fits, to preclude any appreciable surface contact. And the internal diameter of the rear portion of sleeve 36 is sufficiently larger than the external diameter of the portion of lifting member 26, which it surrounds, to prevent any appreciable frictional engagement therebetween.

Rigidly mounted on the forward end of lifting member 26 is a ball-engaging member 44 provided with a tapered ball-engaging peripheral surface 46, the diameter of this surface decreasing in the direction of the lifting member. Member 44 may be secured to or integrally formed with lifting member 26 and, as shown, a screw 48 extending through member 44 and threaded into the end of member 26 effects the desired union between the members.

Balls 42 are adapted to be engaged by tapered surface 46 when the latter is moved in lift direction relative to cage 38 and this engagement forces the balls radially outwardly into engagement with the internal surface of barrel 28. This tends to lock together the ball-engaging members 44 and 28 and the elements secured thereto, namely, lifting member 26 and stud holder 22 and renders mechanism 24 operative.

An internal shoulder 50 is formed in the forward end of sleeve 36 adjacent to cage 38 and is adapted to engage a shoulder 52 in the forward end of member 26 to provide a stop for the movement in plunge direction of lifting member 26 relative to sleeve 36. At the rear end of sleeve 36, an outwardly extending flange 54 is provided and is adapted to engage an inwardly extending flange 56 in intermediate section 20 of the housing in its movement in plunge direction. Flange 56 fixes the foremost position of sleeve 36 relative to housing 10.

A main spring 58 normally biases member 30 and stud holder 22 in a plunge direction, the spring being held under compression between a shoulder 60 provided by intermediate section 20 of the housing and a shoulder 62 of member 30.

In a preferred form of the connecting mechanism, when shoulders 50 and 52 are in engagement, mechanism 24 is inoperative, i.e. balls 42 are inoperative to effect frictional engagement between barrel 28 and member 44. Thus, so long as shoulder 52 is held in engagement with shoulder 50, barrel 28 and hence stud holder 22 is free for movement in either direction relative to lifting member 26. A spring 64, located between internal shoulder 56 and an external shoulder 66, provided by the base of ball cage 38, normally biases sleeve 36 in a plunge direction. A further spring 68, which exerts a sufficient biasing force upon lifting member 26 to overcome the weight thereof urges lifting member 26 in a plunge direction so that normally shoulder 52 engages shoulder 50 and maintains connecting mechanism 24 inoperative.

Suitable means are provided in the gun structure to apply a lifting force to member 26. In the form shown, this means comprises a solenoid 70. Lifting member 26 is the movable core of the solenoid and includes a portion 72 of enlarged diameter, a tapered portion 74 and a rear portion 76 of diminished diameter. Surrounding movable core 26 is the solenoid coil 78, which is housed in a metallic structure comprising an internal cylindrical sleeve 80, for example of brass, an external sleeve 82, for example of steel, a front plate 84, rear wall 86 and a stationary core 88. Stationary core 88, rear wall 86 and outer sleeve 82 may be integrally formed and this integral structure is preferably provided with an internal bore that slidably receives core portion 76.

A cap member 90 threads into the opening at the rear of gun barrel 12, member 90 being preferably formed of an electrically nonconducting material as, for example, the same plastic material from which the gun housing is formed. Spring 68 which biases movable core 26 in a plunge direction is preferably mounted between the end of reduced portion 76 of the movable core and the inner wall of cap 90. Cap 90 is preferably secured to stationary core 88 and rear wall 86 so that the cap, the stationary core, wall 86 and sleeve 82 move as a unit. However, plate 84, inner sleeve 80 and solenoid coil 78 are free to move angularly with respect to the remainder of the solenoid housing but are restrained by outer sleeve 82 so as to move axially along with the outer sleeve. Plate 84 abuts against one end of inner sleeve 80 and the other end of the sleeve abuts against wall 86 so that the axial position of the front surface of plate 84 is precisely fixed in the gun housing in relation to the stationary core 88 of the solenoid and the axial position of plate 84 may be controlled by adjusting the position of cap 90. By mounting plate 84 and solenoid coil 78 so that the latter is not rotated along with sleeve 82, adjustment of cap 90 leaves unaffected the electrical connections which are made to the solenoid coil through plate 84 despite the rotation of sleeve 82.

To precisely control the lift of the stud and prevent over-travel of stud holder 22 relative to lifting member 26, sleeve 36 is so formed and mounted in relation to lifting member 26 and stationary core 88 that, during the lift, the end of sleeve 36 engages plate 84 and core 74 engages stationary core 88. It is to be observed that adjustment of the total lift may be obtained by adjusting the position of plate 84 by means of cap 90 but that such adjustment does not affect the aforementioned sequence of operations because the axial position of plate 84 is fixed relative to the axial position of stationary core 88. By having sleeve 36 engage and be positively stopped before lifting member 26 engages any stop, the stopping force is transmitted through the sleeve to balls 42 in a direction that tends to augment the wedging action between the plate-engaging surfaces of elements 44 and 28. Stud holder 22 is thus rigidly secured through member 30, balls 42 and member 44 to lifting member 26 and any over-travel of holder 22 relative to member 26 is prevented.

Disposed in handgrip 14 of the housing, in a position to be readily engaged by the finger of the gun operator, is a trigger in the form of a push button 91 which, when depressed, is adapted to actuate a control switch 92. A pair of electrical cables 93 and 94 preferably extend through the bottom of the handgrip into the housing to effect the necessary electrical connections. Cable 94 provides the welding current and is connected by a connector element 95 to a conducting rod 96 which in turn is affixed to and makes contact with conductor 34. The structure comprising conductor 34, rod 96 and connector 95 is freely movable longitudinally of the gun barrel 12 along with stud holder 22, cable 94 being sufficiently flexible and having enough play in the gun handle to permit such free movement. Cable 93 carries four control wires 93a, 93b, 93c and 93d, wires 93a and 93b being connected to switch 92 and wires 93c and 93d extending upwardly through the gun housing to connect with solenoid coil 78 through plate 84.

The gun of FIG. 1 is shown in lift position with flange 54 engaging plate 84 and mechanism 24 locked in operative position. However, at the beginning of the stud welding cycle, stud holder 22 is in its foremost position in plunger direction, being held in this position by the pressure of spring 58. Under the influence of spring 64, sleeve 36 and the balls carried thereby are also urged into their foremost position in plunge direction. Similarly, lifting member 26 is biased by spring 58 in this same direction and, as noted hereinabove and because of the engagement of shoulders 50 and 52, connecting mechanism 24 is inoperative to effect engagement between member 44 and barrel 28. In this position, therefore, stud holder 22 is free to be moved axially against the bias of spring 58 and is so displaced initially as the stud and arc shield held by holder 22 are positioned in engagement with the base workpiece to which the stud is to be secured. Thereafter, by depressing trigger 91 the welding cycle is begun and the energization of solenoid 78 moves members 26 in a lift direction while sleeve 36 continues to be biased in plunge direction by its spring 64. As a result, when lifting member 26 has moved a predetermined, constant short distance in lift direction, balls 42 frictionally engage and are wedged between the surface 46 of member 44 and the internal surface of barrel 28. This locks together lifting member 26 and stud holder 22 and begins the lift of the latter. The lift is terminated when the end of flange 54 of sleeve 36 abuts against plate 84 and renders more positive the locking engagement between the stud holder 22 and the lifting member 26. The elements are so held as long as solenoid 78 remains energized.

Upon the deenergization of the solenoid coil, stud holder 22, sleeve 36 and lifting member 26 are moved in a plunge direction under the influence of their respective springs and the stud held by the holder is plunged into engagement with the body member, completing the weld cycle.

Referring now to FIG. 2, the novel control and energization circuit for the gun structure of FIG. 1 is shown diagrammatically as comprising a welding current initiation network 97 and a welding current termination network 99. Initiation network 97 comprises generally an alternating current power input 100, a rectifier 102 for providing direct current to enregize gun solenoid 78 and to generate the pilot and welding arcs, and suitable associated switching. The arc initiation circuit may be of any conventional design. The arc termination network, embodying the present invention, includes a shunted portion 106 of the welding current cable 94, a transistor stage 108 for amplifying the voltage across shunted portion 106, an RC transient network 150, 140 for producing an indication at the end of an interval of time that is a function of the voltage output of transistor stage 108, and a transistor stage 110 for producing a signal that terminates the welding current. More specifically, the initiation and termination networks operate as follows.

Trigger 91 of gun 104 constitutes a normally open switch. When trigger 91 is actuated, a relay 114 is energized by alternating current from transformer 100. Energization of relay coil 114 closes normally open switches 116, 118 and 120. Switch 116 provides an interlock across trigger 91 to maintain current through relay 114 when trigger 91 is released. The closing of switch 120 energizes gun solenoid 78 to lift the welding stud and generates a current in current cable 94 to establish a pilot arc between the stud and the base. The closing of switch 118 energizes relay coil 124, which closes switch 126 to establish the welding arc.

The closing of trigger switch 91 also energizes relay coil 130 which is supplied with direct current from a diode 132. Diode 132 converts the alternating current from transformer 100 to a pulsating direct current. The energizing of relay coil 130 closes a switch 134 and opens a switch 136. Closing of relay 134 energizes the timing cycle by allowing direct current to be applied to a Zener diode 138, of the type which conducts in the forward direction only above a predetermined applied voltage. Zener diode 138 serves to maintain a steady voltage and a minimize transients in the transistor circuitry. The opening of switch 136 removes the short across a capacitor 140 so that it can charge in response to a voltage applied to its terminals. Transistors 108 and 110 are nonconducting in the absence of forward bias.

When the welding arc is established by the closing switch 126, welding current begins to flow in welding cable 94, of which shunted portion 106 is a part. This current appears as a small voltage drop, usually of the order of millivolts, across portion 106. Using the convention of electron flow minus to plus, the base of transistor 108 is connected to the negative extremity of portion 106. The emitter of transistor 108 is connected to a three position switch 142, the three terminals of which are connected to taps on shunt 106 in order to permit adjustment of the range of operation. A negative voltage applied between the base and the emitter of transistor 108 forward biases the transistor to the conducting state. The electron flow in the collector circuit of this transistor develops voltage across a resistor 144, which depends on and is directly proportional to the applied bias voltage from portion 106. A resistor 146 serves to stabilize the transistor with which it is associated and a resistor 148 serves to stabilize the circuit with which it is associated.

The voltage developed across resistor 144 is applied across a potentiometer 150 and capacitor 140, an RC combination which is capable of causing time variations of asosciated circuits in response to applied voltages. Capcitor 140 can be charged when switch 136 is opened. When the voltage of this capacitor reaches the magnitude necesary for conduction of transistor 110, a period of time dependent on the setting of potentiometer 150 and capacitor 140 has elapsed. The length of this period of time is dependent upon the setting of potentiometer 150 and the applied voltage, which are the only variables. When transistor 110 conducts, a relay coil 152 is energized, whereby a switch 154 is closed and a switch 156 is opened.

Switch 154, when closed, directly applies the available voltage across relay 152, thereby developing a magnified field which ensures sharp operation of this relay. The opening of switch 156 deenergizes relay 114 thereby opening switches 116, 118 and 120 in order to cut off the welding arc. At this point, if trigger 91 is kept closed, switch 156 will remain open and no further welding current can flow. If trigger 91 is released, relay 130 is deenergized at a delayed rate because of the presence of a capacitor 158.

In operation, therefore, energization of trigger 91 results in operation of the initiation circuit which causes the removal of the stud from the base in order to generate a pilot arc and the subsequent generation of a welding arc. When the RC transient network of the termination circuit accumulates a predetermined charge, i.e. when the amount of heat generated reaches a predetermined point, the welding current is interrupted and the stud is plunged toward the base to complete the welding cycle.

It will be understood that a variety of alternative embodiments of the termination circuit herein disclosed are possible. Thus the sensor may be a radio frequency tuned to circuit or a photosensitive detector and the timer may be a voltage detector or current detector in association with an alternative clock.

Since certain changes may be made in the above apparatus without departing from the scope of the invention herein involved, it is intended that all matter contained in the above disclosure or shown in the accompanying drawing shall be interpreted in an illustrative and not in a limiting sense.

What is claimed is:

1. In a stud welding apparatus comprising a welding gun including means for holding a stud, means including a solenoid for moving said stud holding means in lift direction and resilient means for moving said stud holding means in plunge direction, the combination in said apparatus of a welding current initiating means and a welding current terminating means, said welding current initiating means including first current supply means, said first current supply means including a conductor, and control means including first relay means for connecting said stud to said conductor when actuated and for disconnecting said stud from said conductor when deactuated, second current supply means for supplying current to said solenoid in order to move said stud holding means in lift direction, said first current supply means and said second current supply means providing direct current, second relay means for connecting said second current supply means to said solenoid and for disconnecting said second current supply means from said solenoid, said welding current terminating means including means for shunting a portion of said conductor to provide a voltage, first electron valve means for amplifying said voltage, means for applying the output of said first electron valve means to a capacitor-resistor transient network, and second electron valve means responsive to the output of said capacitor-resistor transient network when the charge across said network reaches a predetermined magnitude, said second electron valve means being operatively connected to said first relay means for deactuating said first relay means in order to disconnect said stud from said conductor.

2. Welding apparatus comprising first means for separating two parts to be welded with respect to each other, second means for generating a direct current electrical arc between said two parts, said second means including a conductor for supplying direct current flow to said arc, third means for shunting a portion of said conductor to provide an electrical voltage representing said current flow, fourth means responsive to said electical voltage to indicate the time at which the quantity of energy transferred by said direct current flow has reached a predetermined value, said fourth means including a resistor-capacitor network across which a predetermined charge is generated within said time by said voltage, fifth means including a switch in series with said conductor responsive to said fourth means for interrupting said current flow substantially at the end of said time, and sixth means for resiliently directing said parts into contact with each other substantially at the end of said time.

3. The welding apparatus of claim 2 wherein said fourth means includes a first electron flow control stage electrically connected between said conductor and said capacitor-resistor network and a second electron flow control stage electrically connected between said capacitor-resistor network and said fifth means, said first electron flow control stage being an amplifier for said voltage and said second electron flow control stage actuating said switch under the control of said resistor-capacitor network.

4. In a stud welding apparatus comprising a welding gun including means for holding a stud, means including a solenoid for moving said stud holding means in lift direction and resilient means for moving said stud holding means in plunge direction, the combination in said apparatus of a welding current initiating means and a welding current terminating means, said welding current initiating means including first current supply means, said first current supply means including a conductor, and control means including first relay means for connecting said stud to said conductor and for disconnecting said stud from said conductor, second current supply means for supplying current to said solenoid for moving said stud holding means in lift direction, second relay means for connecting said second current supply means to said solenoid and for disconnecting said second current supply means from said solenoid, said first current supply means and said second current supply means providing direct current, said welding current terminating means including means shunted across a portion of said conductor to provide a voltage, first solid state electron flow control means for indicating said voltage, means for applying the output of said first solid state electron flow control means to a capacitor and resistor transient network, said resistor being adjustable, and second solid state electron flow control means responsive to the output of said capacitor-resistor transient network when the charge across said capacitor-resistor transient network reaches a predetermined magnitude, said second solid state electron flow control means being operatively connected to said first relay means and said second relay means.

5. In a stud welding apparatus comprising a welding gun including means for holding a stud, means including a solenoid for moving said stud holding means in lift direction and resilient means for moving said stud holding means in plunge direction, the combination in said apparatus of alternating current input means, rectifying means responisve to said alternating current input means, a first conductor and a first switch serially connected from said rectifying means to said stud holding means and to said solenoid, a second conductor and a second switch serially connected between said rectifying means and said stud holding means, welding current initiating means and welding current terminating means, said welding current initiating means including control means, said control means having first relay means for actuating and deactuating said first switch in order to establish a pilot arc between said stud holding means and ground and to energize said solenoid, said control means having second relay means for actuating and deactuating said second switch in order to establish a welding arc between said stud holding means and ground, said welding current terminating means including means for shunting a portion of said second conductor to provide a voltage, first electron flow control means responsive to said voltage, means for applying the output of said first electron flow control means to a capacitor-resistor transient network, and second electron flow control means responsive to the output of said capacitor-resistor transient network when the charge across said network reaches a predetermined magnitude, said second electron flow control means being operatively connected to said second relay means in order to deactuate said second relay means.

6. In a stud welding apparatus comprising a welding gun including means for holding a stud, means including a solenoid for moving said stud holding means in lift direction and resilient means for moving said stud holding means in plunger direction, the combination in said apparatus of alternating current input means, rectifying means responsive to said alternating current means, a first conductor and a first switch serially connected from said rectifying means to said stud holding means and to said solenoid, a second conductor and a second switch serially connected between said rectifying means and said stud holding means, welding current initiating means and welding current terminating means, said weldig current initiating means including control means, said control means having first relay means for actuating and deactuating said first switch in order to establish a pilot arc between said stud holding means and ground and to energize said solenoid, said control means having second relay means for actuating and deactuating said second switch in order to establish a welding arc between said stud holding means and ground, said welding current terminating means including means for shunting a portion of said second conductor to provide a voltage, a first transistor stage including a base, an emitter and collector, a switch across said second transmitter and collector, a third relay in series with said second emitter and collector, said second base being resistantly coupled to said first base, a capacitor-resistor transient network responsive to the output of said first transistor stage in order to control the current through said second transistor stage and thereby to control said third relay in series with said second emitter and collector.

References Cited in the file of this patent
UNITED STATES PATENTS

| | | |
|---|---|---|
| 1,288,589 | Hood | Dec. 24, 1918 |
| 2,024,542 | Simon | Dec. 17, 1935 |
| 2,694,762 | Ruetschi | Nov. 16, 1954 |
| 2,923,863 | Chesson et al. | Feb. 2, 1960 |
| 2,938,105 | Kelemen | May 24, 1960 |
| 2,990,506 | Montross | June 27, 1961 |
| 3,021,454 | Pickens | Feb. 13, 1962 |